Feb. 13, 1934.    H. H. HENRY    1,947,158
BATTERY TERMINAL
Original Filed June 9, 1932
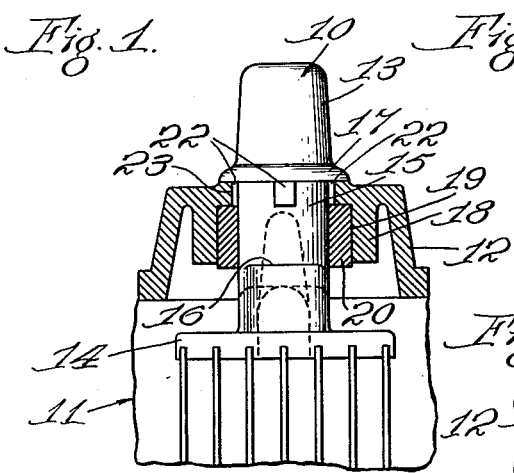
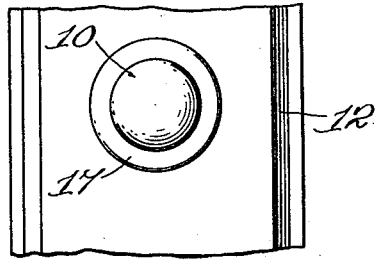
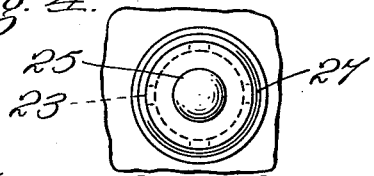
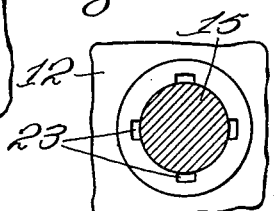
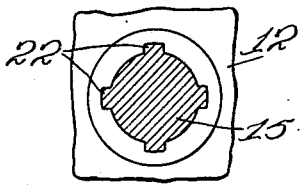
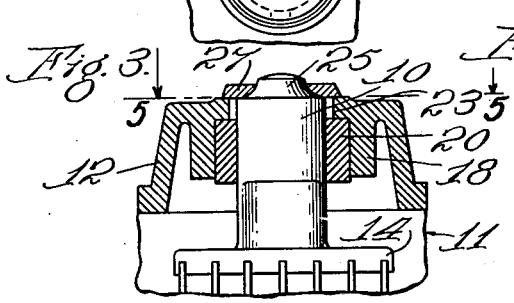
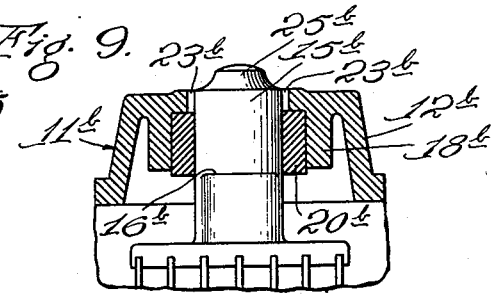
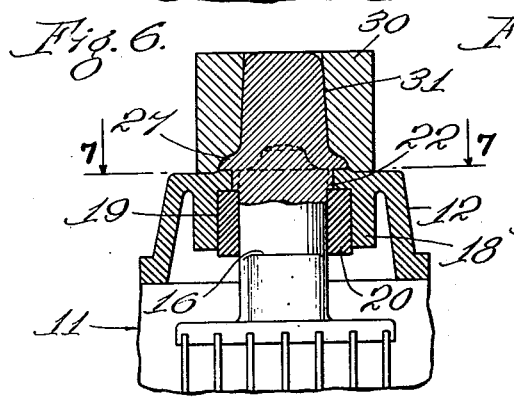
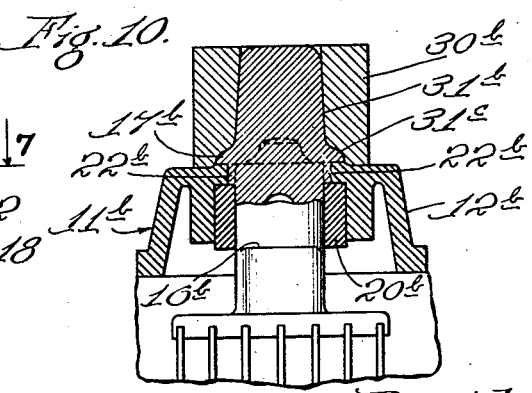
Inventor:
Harry H. Henry.
By Dyrenforth, Lee, Chritton & Wiles
Attys.

Patented Feb. 13, 1934

1,947,158

UNITED STATES PATENT OFFICE 1,947,158

BATTERY TERMINAL

Harry H. Henry, Chicago, Ill., assignor to Monark Battery Company, Inc., Chicago, Ill., a corporation of Delaware Original application June 9, 1932, Serial No. 616,310. Divided and this application February 10, 1933. Serial No. 656,171

5 Claims. (Cl. 22—203)

The invention relates to methods of producing battery terminals and is a division of my copending application Serial No. 616,310, for Battery terminals, filed June 9, 1932.

An object of the invention is to provide improved methods for forming battery terminals which are equipped with means for preventing them from being driven through the walls of the battery when one hammers thereon and with means for preventing them from being angularly displaced around their longitudinal axes.

Other objects and advantages will become apparent as the following detailed description progresses, reference being had to the accompanying drawing, wherein—

Fig. 1 is a fragmentary section taken through a battery which comprises a terminal embodying the invention; Fig 2 is a plan view of the apparatus shown in Fig. 1; Fig. 3 is a fragmentary section illustrating one stage in the manufacture of the improved battery terminal shown in Fig. 1; Fig. 4 is a plan view of the structure shown in Fig. 3; Fig. 5 is a section taken on line 5—5 of Fig. 3; Fig. 6 is a fragmentary section illustrating another stage in the manufacture of the improved terminal shown in Fig. 1; Fig. 7 is a section taken on line 7—7 of Fig. 6; Fig. 8 is a perspective view of a cast member which embodies another form of the invention; Fig. 9 is a fragmentary section taken through a battery to illustrate one stage in the manufacture of a terminal which embodies still another form of the invention; and Fig. 10 is a section which illustrates a later stage in the manufacture of the terminal shown in Fig. 9.

Referring for the present to Figs. 1 to 7, inclusive, wherein a preferred embodiment of the invention is illustrated, the reference character 10 designates generally a terminal of a battery 11 which comprises a top wall 12 formed from any suitable material. The terminal 10 comprises a head-portion 13 and a plate-portion 14 to which the pasted grids or electrodes are "burned". Formed integral with the plate-portion 14, is a shank portion 15 provided with a shoulder 16. At its upper end, the shank 15 is provided with an integral outwardly extending bead or flange 17 which cooperates with the shoulder 16 to hold the terminal 10 against displacement relative to the wall 12.

The wall 12 is provided with a downwardly extending flange 18 which forms a recess 19. Disposed in the recess 19 is a sleeve or tubular gasket 20 which is preferably formed from rubber, or the equivalent. The sleeve or tubular gasket 20 is preferably formed with an inside diameter which is less than the diameter of the shank 15, so that when the shank is assembled with the sleeve, the sleeve is compressed and forms a fluid-tight seal around the shanks.

The shank 15 is preferably provided with integral lugs 22 which engage notches 23 formed in the top wall 12. The lugs 22 prevent angular displacement of the terminal 10 around its vertical or longitudinal axis.

One method of producing the terminal 10 and assembling it with the top wall 12 of the battery is illustrated in Figs. 3 to 7, inclusive. Referring to Fig. 3, it will be noted that the terminal 10 in its first stage of manufacture is considerably shorter than it is in its final stage. It will be noted that the terminal 10 is first formed with an integral tapering projection 25 at its upper end which projects slightly above the top wall 12 when the terminal is formed through the sleeve or tubular gasket 20 from the bottom side of the top wall. After the shank 15 has been assembled with the top wall 12 in the manner illustrated in Fig. 3, the apertured member or collar 27 is seated on the upper end of the shank 15 in such manner that it encircles the projection 25. The collar 27 is preferably cast or formed from the same material as the shank 10 and will fuse at a relatively low temperature. It will be noted that the collar 27 is disposed above the notches 23.

After the collar 27 has been assembled with the shank 15, as illustrated in Fig. 3, a mold member 30 is placed upon the top wall 12, as illustrated in Fig. 6. The mold member 30 comprises a mold cavity 31 which conforms to the shape of the upper end of the finished or completed terminal 10. After the mold has been positioned upon the top wall 12, the collar 27 and the top surface of the shank 15 are subjected to the heat of an oxyacetylene flame which fuses the collar and also the metal of the upper end of the shank. Part of the metal of the collar runs down the notches 23 to form the lugs 22. Additional metal is then added to the shank by holding a bar of the proper metal over the mold member, and subjecting it to the oxyacetylene flame so that the metal fuses and runs down into the mold cavity. The metal in the mold cavity is preferably subjected to the heat of the flame until the cavity has been filled. After the cavity has been filled, the mold member 30 is removed from the completed terminal. It is understood, of course, that the metal forming the upper end of the improved terminal is preferably the same as that employed in the manufacture of the shank portion. This metal fuses at a relatively low temperature.

When the terminal 10 is formed by practising the method illustrated in Figs. 4 to 7, inclusive, the bead 17 is completely and neatly formed at the upper end of the shank portion 15. In other words, there is no failure of the fused metal to flow to all parts of the mold cavity 31. It will be readily understood that if it is so desired, the notches 23 may be omitted from the wall 12, in which event, the metal of the collar 27 will not be employed to produce the lugs 22.

Fig. 8 illustrates another embodiment of the invention in which a collar 27a is shown, which collar 27a may be employed in place of the collar 27. The collar 27a is preferably formed of the same material as the collar 27. The collar 27a is provided with integral lugs 22a adapted to seat in the notches 23 when the collar 27a is assembled with the shank 15.

Figs. 9 and 10 illustrate another embodiment of the invention. Referring first to Fig. 9, wherein a shank 15b, substantially identical in construction with the shank 15 shown in Fig. 3, is assembled with the top wall 12b of a battery 11b, the top wall 12b being identical with the top wall 12 shown in Figs. 1 to 7, inclusive. Thus, the top wall 12b is provided with notches 23b and a downwardly extending flange 18b. The shank portion 15b projects through a sleeve or tubular gasket 20b, preferably formed of rubber, or the equivalent. The shank 15b is formed with a shoulder 16b engageable with the lower end of the sleeve 20b. At its upper end, the shank 15b is provided with an integral tapering projection 25b which is identical with the projection 25 described above.

After the shank 15b has been assembled with the top wall 12b, as illustrated in Fig. 9, a mold member 30b is placed upon the top wall 12b as illustrated in Fig. 10. The mold member 30b is provided with a mold cavity substantially identical with the mold cavity 31 described above. The upper end of the shank portion 15b is then subjected to the heat of an oxyacetylene flame to fuse it, after which additional metal is added in the manner described above in connection with the mold 30. It will be noted that the mold cavity 31b is provided with an annular groove 31c at its lower end to form a bead 17b identical with the bead 17 shown in Fig. 1. It is understood, of course, that the fused metal flows into the notches 23b to form the lugs 22b which are identical with the lugs 22 described above.

If it is so desired, the notches 23b may be omitted from the wall 12b.

A feature of the invention is that the beads 17 and 17b prevent the improved terminal from being driven through the top wall of the battery when a conductor is being clamped thereto. Another advantage of the improved construction is that the lugs 22 and 22b prevent the terminal from being angularly displaced around its vertical or longitudinal axis. Such displacement would, of course, displace the pasted grids or electrodes in the battery case.

The beads 17 and 17b may be said to provide shoulders which cooperate with the shoulder 16 and the corresponding shoulder 16b on the shank 15b to prevent displacement of the shanks through the hole of the top walls. Unless otherwise indicated, the sleeves 20 and 20b will be considered, in the appended claims, as parts of the top walls of the batteries.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. The method of securing a battery terminal to a wall of a battery case, which comprises forming an aperture in said wall and notches in the upper periphery of said aperture, inserting a shank member in said aperture, and molding a head member on said shank member in such manner that a bead and lugs are simultaneously formed integral with said shank member and said head member, said bead engaging the outer surface of said wall and said lugs engaging said notches.

2. The method of forming a battery terminal in the wall of a battery case, which comprises forming an aperture through said wall and forming notches in the upper periphery of said aperture, inserting a shank member in said aperture, forming a metallic collar with projecting lugs, placing said collar on the outer end of said shank member with its lugs extending into said notches, and molding a head member on the outer end of said shank member in such manner that said head member, said collar, and said shank member are welded to each other.

3. The method of securing a battery terminal to the wall of a battery case, which comprises forming a tubular aperture in said wall and notches in the upper periphery of said aperture, inserting an elastic tubular rubber member in the lower portion of said aperture and below said notches, inserting a shank member in said rubber member to expend its against the wall of said aperture, and forming a head member on said shank member in such a manner that a bead and lugs are formed integral with said shank member and said head member, said bead engaging the outer surface of said wall and said lugs engaging said notches.

4. The method of securing a battery terminal to the wall of a battery case, which comprises forming a tubular aperture in said wall and notches in the upper periphery of said aperture, introducing an elastic rubber tube in the lower portion of said aperture, said tube forming a bottom wall for said notches, inserting a shank member in said aperture, and molding a head member on said shank member and in such manner that a bead and lugs are formed integral with said shank member and said head member, said bead engaging the outer surface of said wall and said lugs engaging said notches and resting upon said rubber tube.

5. The method of securing a battery terminal to a wall of a battery case, which comprises forming an aperture in said wall and notches in the periphery of said aperture, inserting a shank member in said aperture, and molding a head member on said shank member in such manner that a bead and lugs are formed integral with said shank member and said head member, said bead engaging the outer surface of said wall and lugs engaging said notches.

HARRY H. HENRY.

CERTIFICATE OF CORRECTION.

Patent No. 1,947,158. February 13, 1934.

HARRY H. HENRY.

It is hereby certified that error appears in the printed specification of the above numbered patent requiring correction as follows: Page 2, line 118, claim 3, for "expend its" read expand it; and that the said Letters Patent should be read with this correction therein that the same may conform to the record of the case in the Patent Office.

Signed and sealed this 15th day of May, A. D. 1934.

Bryan M. Battey (Seal)

Acting Commissioner of Patents.